(12) United States Patent
Hull

(10) Patent No.: US 12,742,705 B2
(45) Date of Patent: Sep. 22, 2026

(54) METHOD AND APPARATUS FOR COLLECTING EVIDENCE

(71) Applicant: Visual Detection Systems LLC, Minerva, OH (US)

(72) Inventor: James L. Hull, Malvern, OH (US)

(73) Assignee: VISUAL DETECTION SYSTEMS LLC, Minerva, OH (US)

( * ) Notice: Subject to any disclaimer, the term of this patent is extended or adjusted under 35 U.S.C. 154(b) by 296 days.

(21) Appl. No.: 18/537,157

(22) Filed: Dec. 12, 2023

(65) Prior Publication Data

US 2025/0189410 A1 Jun. 12, 2025

(51) Int. Cl.
*G01N 1/02* (2006.01)
*G06Q 50/26* (2024.01)

(52) U.S. Cl.
CPC ............. *G01N 1/02* (2013.01); *G06Q 50/265* (2013.01); *G01N 2001/027* (2013.01); *G01N 2001/028* (2013.01)

(58) Field of Classification Search
CPC ............... G01N 1/02; G01N 2001/027; G01N 2001/028; G01N 2001/005; G01N 2001/007; G06Q 50/265
See application file for complete search history.

(56) References Cited

U.S. PATENT DOCUMENTS

| | | | |
|---|---|---|---|
| 9,968,145 | B2 | 5/2018 | Hull |
| 10,238,159 | B2 | 3/2019 | Hull |
| 10,390,575 | B2 | 8/2019 | Hull |
| 10,602,787 | B2 | 3/2020 | Hull |
| 10,602,788 | B2 | 3/2020 | Hull |
| D890,999 | S | 7/2020 | Hull |
| 10,750,802 | B2 | 8/2020 | Hull |
| 10,820,639 | B2 | 11/2020 | Hull |
| 10,820,640 | B2 | 11/2020 | Hull |
| 10,869,512 | B2 | 12/2020 | Hull |
| D910,930 | S | 2/2021 | Hull |
| 11,071,338 | B2 | 7/2021 | Hull |
| 11,172,714 | B2 | 11/2021 | Hull |
| 11,197,509 | B2 | 12/2021 | Hull |
| 11,825,893 | B2 | 11/2023 | Hull |

(Continued)

FOREIGN PATENT DOCUMENTS

WO WO-2021053315 A1 * 3/2021 ............. B65D 33/16

*Primary Examiner* — Thomas M Hammond, III
(74) *Attorney, Agent, or Firm* — Sand, Sebolt & Wernow Co., LPA

(57) ABSTRACT

An evidence kit and method of using the same to collect and preserve evidence taken from a crime or accident scene. The method includes unsealing a container and removing a substrate therefrom. A pair of gloves may also be taken from the container and is donned to handle the substrate during evidence taking. The substrate is brought into contact with a surface such that trace-evidence is transferred to the substrate. An evidence bag is removed from the container, the substrate is placed in the bag, and the bag is sealed. Information regarding the evidence collection is recorded on the bag. The wipe may change color if brought into contact with particular substances at the scene so as to signal the presence of those substances. The material of the gloves is resistant to one or more of opioids, opioid-containing compounds, toxic and/or corrosive chemicals, and bodily fluids.

15 Claims, 8 Drawing Sheets

(56) References Cited

U.S. PATENT DOCUMENTS

| | | | | |
|---|---|---|---|---|
| 2018/0080855 | A1* | 3/2018 | Taylor | G01N 1/2813 |
| 2021/0302446 | A1* | 9/2021 | Joy | G01N 33/94 |
| 2022/0371803 | A1* | 11/2022 | Mason | A61B 42/10 |
| 2023/0270192 | A1 | 8/2023 | Hull | |
| 2024/0261779 | A1* | 8/2024 | Loudermilk | B01L 3/5023 |
| 2024/0272182 | A1* | 8/2024 | Loane | G01N 31/22 |

* cited by examiner

METHOD AND APPARATUS FOR COLLECTING EVIDENCE

TECHNICAL FIELD

This disclosure is directed to evidence collection equipment. In particular, the disclosure relates to a kit for use in collecting physical evidence from a crime scene or an accident scene and preserving that physical evidence for subsequence analysis. Specifically, the disclosure is directed to an evidence collection kit comprising a flexible container housing a substrate and an evidence bag. In some instance, the evidence kit includes a pair of gloves which are retained in the flexible container. In some instances, the substrate is kept in a sanitary condition in a pouch or wrapper. The substrate is utilized to collect evidence from the scene and, in some instances, undergoes a physical change which helps identify the nature of the collected evidence. The evidence may be in the form of a powder, a pill, or a liquid. The evidence bag is configured to receive the substrate therein after evidence collection and is sealable to help preserve the evidence. In some instances, the gloves are also placed into the evidence bag with the substrate.

BACKGROUND ART

It is often necessary for evidence to be collected from a crime scene or an accident scene. According to the Federal Bureau of Investigation (FBI), there are five steps recommended for collecting and preserving evidence. The first recommended step is that the evidence must be legally obtained. The second recommended step is that detailed notes describing the collected evidence should be made. The FBI's third recommended step is that the evidence should be identified accurately and positively. In a fourth step, the evidence is to be packaged properly for identification, storage, and/or shipment to a laboratory for further examination and analysis. Finally, it is needful that a proper chain of custody of the evidence be established and maintained.

When gathering evidence, an investigator may collect blood, bodily fluids, fibers, and, if present, samples of any pills or powders present at the crime scene or accident scene. Depending on the nature of the evidence, collected solid evidence may be placed in paper bags, envelopes, and packets, while liquid evidence is collected in leak-proof containers. The bag, envelope, packed or leak-proof container is then closed and sealed and the investigator will initial, date, and write the time of collection across the sealed area. Placing this information on the sealing tape helps to ensure any tampering with the evidence is detectable.

One of the issues with collecting pills or powder-type evidence at a crime or accident scene is that the nature of the pill or powder being collected is unknown. With the recent increase in opioid use, gathering unknown pills and powders can place the investigators at personal risk. If the investigator accidentally comes into physical contact with compounds that include fentanyl, carfentanil, or xylazine (which is a non-opioid sedative or tranquilizer), the investigator may go into physical distress if the fentanyl, carfentanil, or xylazine contacts their skin. This may occur even if the investigator is wearing gloves.

SUMMARY OF THE INVENTION

The present disclosure relates to an evidence kit and method of using the same to collect and preserve evidence taken from a crime scene or accident scene. The method includes unsealing a flexible or resilient container and removing a substrate therefrom. The substrate may be in the form of a wipe and may be retained in a sanitary condition by storing the wipe in a pouch or wrapper that is only opened immediately prior to use so that the wipe cannot be accidentally contaminated. A pair of gloves may also be provided in the container and will be donned in order to handle the substrate during evidence taking. The substrate is brought into contact with a surface at the crime scene or accident scene so that trace-evidence may be transferred to the substrate. The trace-evidence may be in the form of a powder that is on the surface or is transferred to the wipe or gloves by handling pills, or the evidence may be in the form of a liquid. After moving the substrate across the surface, an evidence bag is removed from the container, the substrate is placed in the bag, and the bag is then sealed to prevent tampering with the evidence and to prevent accidental contamination of the substrate. Information regarding the evidence collection is recorded on the bag. The substrate or wipe may be manufactured from a material which traps some of the trace-evidence and which may change color if brought into contact with particular substances at the scene. The change in color signals the presence of particular harmful substances, such as opioids, to the person gathering the evidence. If this change in color is noticed, the person gathering the evidence is made aware of the potential personal danger the evidence may pose to them. The material of the gloves which are included in the evidence kit preferably is one that is resistant to one or more of opioids, opioid-containing compounds, toxic and/or corrosive chemicals, and bodily fluids to provide the person gathering the evidence with additional protection.

In one aspect, an exemplary embodiment of the present disclosure may provide an evidence kit for taking and preserving evidence from a crime scene or accident scene, wherein the evidence kit comprises a substrate configured to remove a substance from a surface and an evidence bag into which the substrate is placed after collection of the evidence from the crime scene or accident scene.

In one embodiment, the evidence kit further comprises a container configured to receive the substrate and the evidence bag therein prior to use, wherein the container is configured to maintain the substrate and the evidence bag in a sanitary condition. In one embodiment, the evidence kit further comprises a pouch or wrapper configured to receive the substrate therein and to retain the substrate in a sanitary condition prior to use. In one embodiment, the substrate is treated to detect a target analyte of one or more of opioids, amine-containing drugs, and xylazine. In one embodiment, the target analyte is one or more of morphine, hydrocodone, oxycodone, fentanyl, carfentanil, naloxone, endorphins, heroin, codeine, cocaine, and mixtures and derivatives thereof. In one embodiment, the substrate is comprised of a material which changes in at least one physical characteristic when exposed to an opioid. In one embodiment, the at least one physical characteristic is a change in color. In one embodiment, the substrate is configured to detect and retain trace amounts of evidence thereon or therein.

In one embodiment, the evidence kit further comprises a pair of gloves, wherein the pair of gloves is placed into the evidence bag after collection of the evidence from the crime scene or accident scene. In one embodiment, the evidence kit further comprises a container configured to receive the pair of gloves, the substrate, and the evidence bag therein prior to use, wherein the container is configured to maintain the pair of gloves, the substrate, and the evidence bag in a sanitary condition. In one embodiment, the pair of gloves is manufactured from a glove material which is resistant to one or more of opioids, toxic substances, corrosive chemicals, and bodily fluids.

In one embodiment, the evidence bag includes a label on an exterior surface thereof, wherein the label includes areas in which information pertaining to an evidence-collection task is able to be entered.

In another aspect, an exemplary embodiment of the present disclosure may provide a method of taking evidence from a crime scene or accident scene comprising providing an evidence kit including a container into which is placed a substrate configured to remove a substance from a surface, and an evidence bag; removing the substrate from the container; contacting the surface with the substrate; collecting powder-evidence from the surface with the substrate; placing the substrate with collected powder-evidence thereon in the evidence bag; and sealing the evidence bag.

In one embodiment, providing the substrate includes manufacturing the substrate from a material which changes in at least one physical characteristic when brought into contact with an opioid drug or a mixture which includes an opioid. In one embodiment, the method further comprises changing the color of the material of the substrate when the substrate is brought into contact with the opioid drug or the mixture which includes the opioid. In one embodiment, the method further comprises removing the substrate from a pouch or wrapper prior to contacting the surface with the substrate.

In one embodiment, the method further comprises providing a pair of gloves as part of the evidence kit, wherein the pair of gloves is placed into the container with the substrate and the evidence bag. In one embodiment, the method further comprises removing the pair of gloves from the container; and donning the pair of gloves before contacting the surface with the substrate. In one embodiment, providing the pair of gloves includes fabricating the pair of gloves from glove material which is one or more of opioid-resistant, bodily fluid resistant, and toxic or corrosive chemical resistant.

In one embodiment, the method further comprises recording evidence-collection-related information on an exterior surface of the evidence bag. In one embodiment, the method further comprises sealing a first sealing strip after placing the pair of gloves and the substrate within the evidence bag. In one embodiment, the method further comprises removing the pair of gloves and the substrate from the evidence bag for examination and/or testing, replacing the pair of gloves and the substrate into an interior of the evidence bag after the examination and/or testing, and sealing a second sealing strip to retain the pair of gloves and the substrate within the interior of the evidence bag.

In another aspect, an exemplary embodiment of the present disclosure may provide a method of taking evidence at a crime scene or accident scene, said method comprising opening a container; removing a pair of gloves from the container; donning the pair of gloves; removing a wipe in a sanitary wrapping from the container; removing the wipe from the sanitary wrapping; wiping a surface at the crime scene or accident scene with the wipe such that the wipe picks up trace-evidence; removing an evidence bag from the container; placing the wipe with trace-evidence thereon into the evidence bag; doffing the pair of gloves; placing the pair of gloves into the evidence bag; and sealing the evidence bag.

BRIEF DESCRIPTION OF THE DRAWINGS

Sample embodiments of the present disclosure are set forth in the following description, are shown in the drawings and are particularly and distinctly pointed out and set forth in the appended claims.

Similar numbers refer to similar parts throughout the drawings.

DETAILED DESCRIPTION

Figure 1:
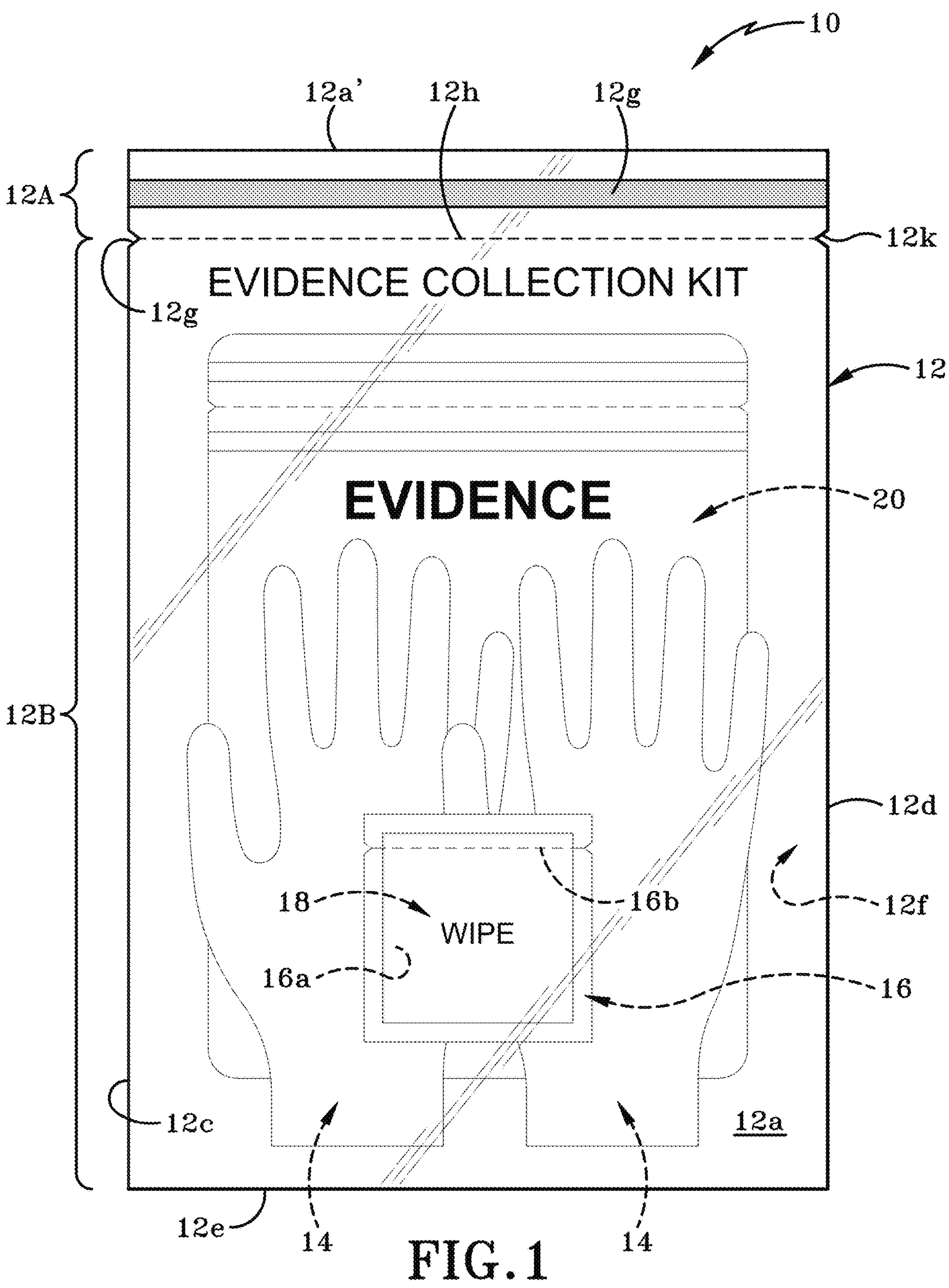
FIG. 1 is a front elevation view of an evidence collection kit in accordance with an aspect of the present disclosure, with the evidence collection kit shown prior to use.
Figure 1A:
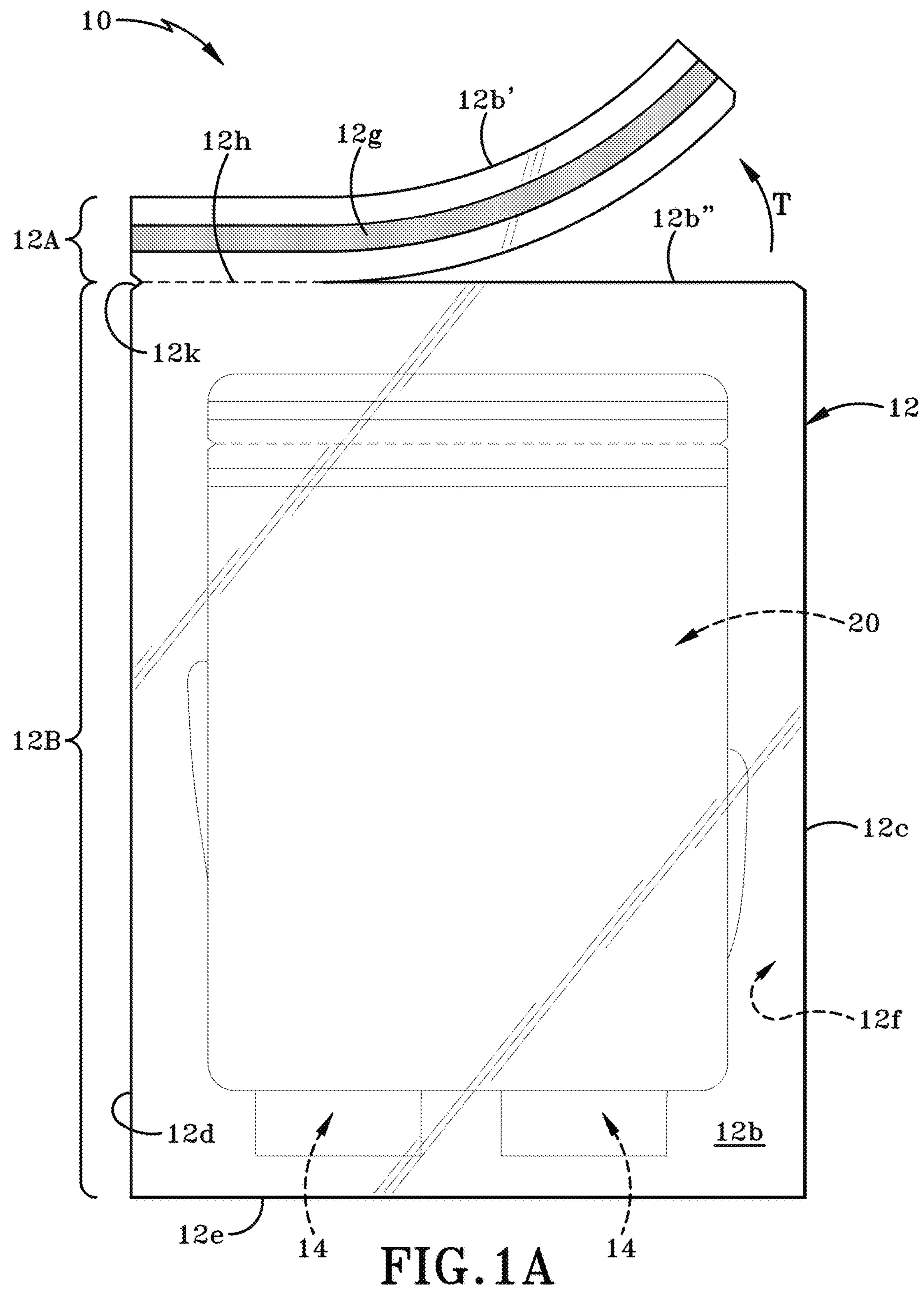
FIG. 1A is a front elevation view of the evidence collection kit showing a tear strip being removed from a top end of a carry bag of the evidence collection kit and showing how a pair of gloves, an evidence bag, and a sanitary wipe are removable from the carry bag.

Referring to FIGS. 1 and 1A, there is shown an evidence kit in accordance with the present disclosure, generally indicated at 10. Evidence kit 10 comprises a container 12, a pair of gloves 14, a pouch 16 containing a substance-detection substrate 18 (also referred to herein as "substrate 18"), and an evidence bag 20.

Container 12 is flexible in nature and is in the form of a bag. In one embodiment, container 12 is a bag fabricated from a flexible plastic material. In one embodiment, the flexible plastic material is transparent. In other embodiments, the flexible plastic material may be opaque or translucent. The flexible container has a front **12*a* and a back 12*b* (FIG. 1A) which are continuous or joined to one another along a first side edge 12*c* and an opposed second side edge 12*d*, and along a bottom edge 12*e*. The front and back bound and define an interior compartment 12*f* into which the other components of evidence kit 10 are received. Initially, the interior compartment 12*f* is accessible through an opening (not shown) defined between a top edge 12*a*' of front 12*a* and a top edge 12*b*' of back 12*b* of the bag. The interior compartment 12*f* is of a size sufficient to receive therein the pair of gloves 14, the pouch 16 with enclosed substance-detection substrate 18, and the evidence bag 20. A sealing strip 12***g* is provided to secure an interior surface of front 12*a* and an interior surface of back 12*b* to one another after the other components of the evidence kit 10 have been received into the interior compartment 12*f*. The sealing strip 12*g* may comprise an adhesive layer applied to the interior surface of one or both of the front 12*a* and back 12*b* of the bag. Alternatively, the sealing strip 12*b* may be a region of the bag in which the plastic material of the front 12*a* and back 12*b* are heat-sealed to one another after the other components of the evidence kit 10 are placed in interior compartment 12*f*. Whatever manner in which the sealing strip 12*g* is provided or formed, sealing of the top regions of the front 12 and back 12*b* to one another with the sealing strip 12*g* closes off access to the interior compartment 12*a*.

Container 12 further defines a line of weakness 12*h* in each of the front 12*a* and back 12*b* a distance downwardly from the respective top edge 12*a*', 12*b*'. The line of weakness 12*h* is illustrated in FIGS. 1 and 1A as extending from first side edge 12*c* of container 12 to second side edge 12*d* thereof. A notch 12*j* is defined in first side edge 12*c* and an opposed notch 12*k* is defined in second side edge 12*d*. The lines of weakness 12*h* extend between the notches 12*j* and 12*k*. The lines of weakness divide the container 12 into a top region 12A and a bottom region 12B as shown in FIG. 1.

When it is desired to access the contents of the interior compartment 12*f* of container 12, a user will grasp one or the other end of the top region 12A of container 12 and will tear the top region 12A from the bottom region 12B along the lines of weakness 12*h*. FIG. 1A shows the top region 12A of container 12 partially torn from the bottom region 12B by pulling the top region in the direction indicated by arrow "T". The full or partial removal of top region 12A permits a user to access the interior compartment 12*f* through a new opening bounded and defined by a new upper end of each of front 12*a* and back 12*b* of container 12, such as upper end 12*b*" shown in FIG. 1A.

Figure 2A:
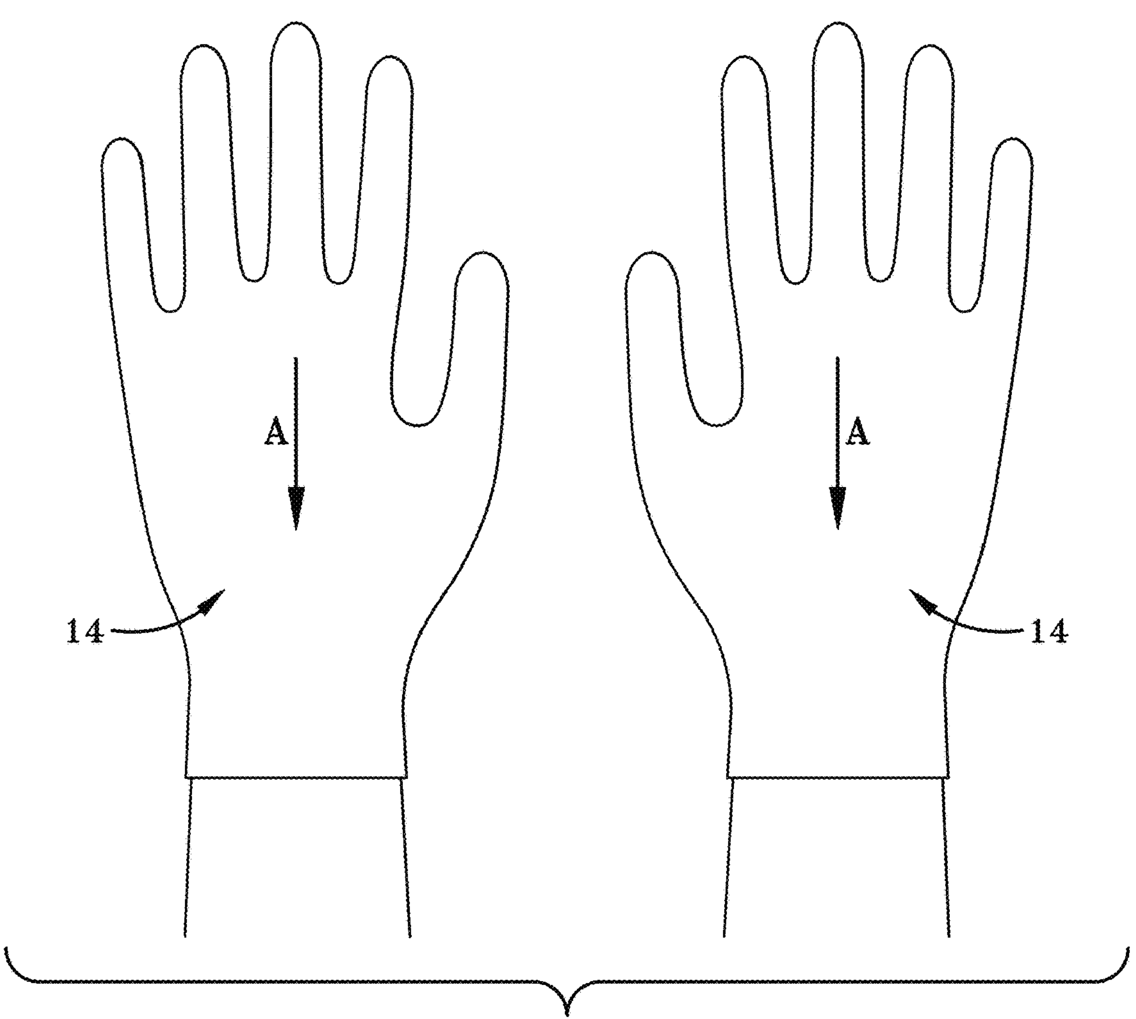
FIG. 2A is a diagrammatic view showing the pair of gloves of the evidence collection kit being pulled over the hands of an evidence taker.

The user will remove the gloves 14 from interior compartment 12*f* and will pull them onto their hands as is illustrated by the arrows "T" shown in FIG. 2A. Gloves 14 may be fabricated of any suitable glove material which will aid in protecting a person wearing the gloves from being harmed by toxic and/or corrosive substances which they may come into contact while gathering evidence. For example, the material of gloves 14 may aid in protecting the glove-wearer from being harmed by opioids such as fentanyl. One suitable type of glove 14 which may form part of evidence kit 10 is any of the gloves described in U.S. Pat. Nos. D910,930; D890,999; 11,825,893; 11,172,714; 11,197,509; 11,071,338; 10,750,802; 10,820,640; 10,602,788; 10,820,639; 10,602,787; 10,869,512; 10,238,159; 9,968,145; 10,390,575, and to publication number US 20230270192, all of which are assigned to Summit Glove, Inc. of Minerva, Ohio, US and are incorporated herein in their entirety. An additional suitable type of glove 14 which may form part of evidence kit 10 is any of the gloves described in U.S. patent application Ser. No. 18/488,288 filed Oct. 17, 2023, and entitled "Drug Resistant Glove" which is also assigned to Summit Glove, Inc. of Minerva, Ohio, and is also incorporated herein by reference in its entirety. In particular, U.S. patent application Ser. No. 18/488,288 discloses a glove manufactured from a glove material which is opioid resistant. In particular, the glove material is resistant to one or more of fentanyl, carfentanil, and mixtures of drugs including fentanyl or carfentanil. Still further, the glove material is resistant to xylazine and to xylazine mixed with an opioid. Yet further, the glove material is resistant to corrosive fluids such as gastric acid.

Figure 2B:
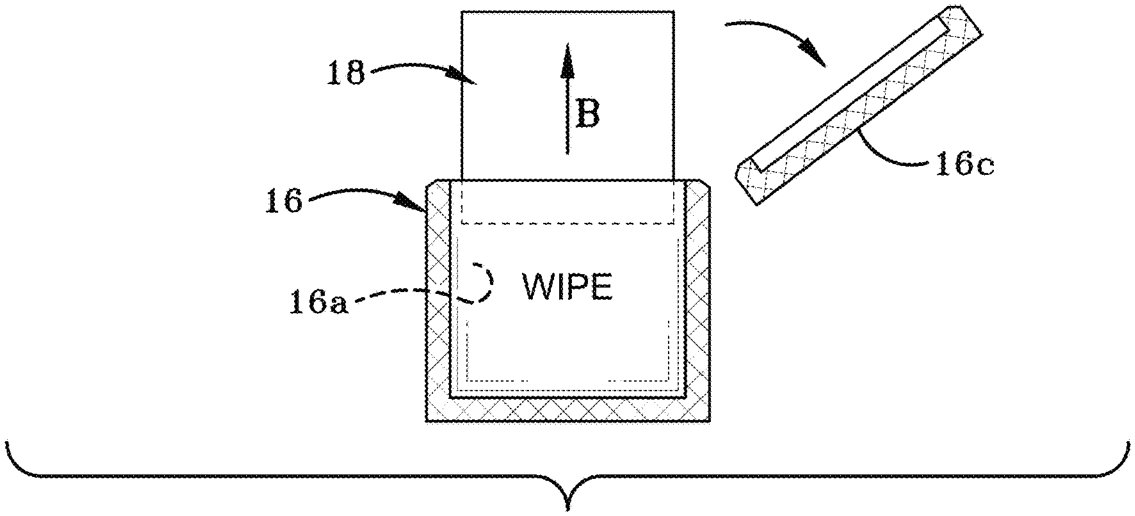
FIG. 2B is a diagrammatic view showing a tear strip being moved off a sanitary wrapper of the evidence collection kit, revealing the wipe housed therein.

After donning gloves 14, the person using the evidence kit 10 will remove the pouch 16 from the interior compartment 12*f* of container 12. Pouch 16 may be of any suitable construction which enables the substrate 18 to be retained within an interior cavity 16*a* of the pouch 16. Pouch 16 is able to be opened once removed from container 12. By way of example only, FIG. 1 shows that pouch 16 includes a line of weakness 16*b* defined in a front and back surface thereof. The line of weakness 16*b* enables a tear strip 16*c* to be removed from pouch 16, as shown in FIG. 2B, permitting access to the substrate 18. The substrate 18 is able to be withdrawn from interior cavity 16*a* as indicated by arrow "B" in FIG. 2B.

One suitable type of pouch 16 which may be included in evidence kit 10 is that disclosed in U.S. Provisional Patent Application Ser. No. 63/488,345 filed on Mar. 3, 2023, and entitled "METHOD AND APPARATUS FOR PACKAGING OPIOID DETECTING WIPES", and U.S. Provisional Patent Application Ser. No. 63/512,792 filed on Jul. 10, 2023, and entitled "METHOD AND APPARATUS FOR PACKAGING OPIOID DETECTING WIPES". Both of these provisional patent applications are assigned to Summit Glove, Inc. of Minerva, Ohio, and are incorporated herein by reference in their entirety. The provisional applications disclose a substrate which is retained within a pouch which also contains a wetting agent that is kept in a separate compartment from the substrate. When it is needful to use the substrate, a seal separating a compartment containing the wetting agent from a compartment containing the substrate is broken, and the wetting agent wets the substrate. Once wet, the substrate is able to be used to detect potentially harmful substances such as opioids and opioid-containing compounds.

The substrate is manufactured or is treated by a wetting agent in the pouch 16 (as described above) to detect a target analyte of one or more of opioids or amine-containing drugs. In particular, the target analyte may be one or more of morphine, hydrocodone, oxycodone, fentanyl, carfentanil, naloxone, endorphins, heroin, codeine, cocaine, and mixtures and derivatives thereof, and substances such as xylazine. The substrate and/or the wetting agent may contain a dye which changes color when the substrate is brought into contact with the potentially harmful substance, i.e., the target analyte.

It will be understood that any suitable manner of packaging the substance-detection substrate 18 may be utilized in evidence kit 10 and that the pouch 16 is an example of one suitable manner of retaining the substrate 18 in an environment that is not able to be contaminated when a person reaches into compartment 12*f* of container 12 to remove substrate 18.

Figure 2C:
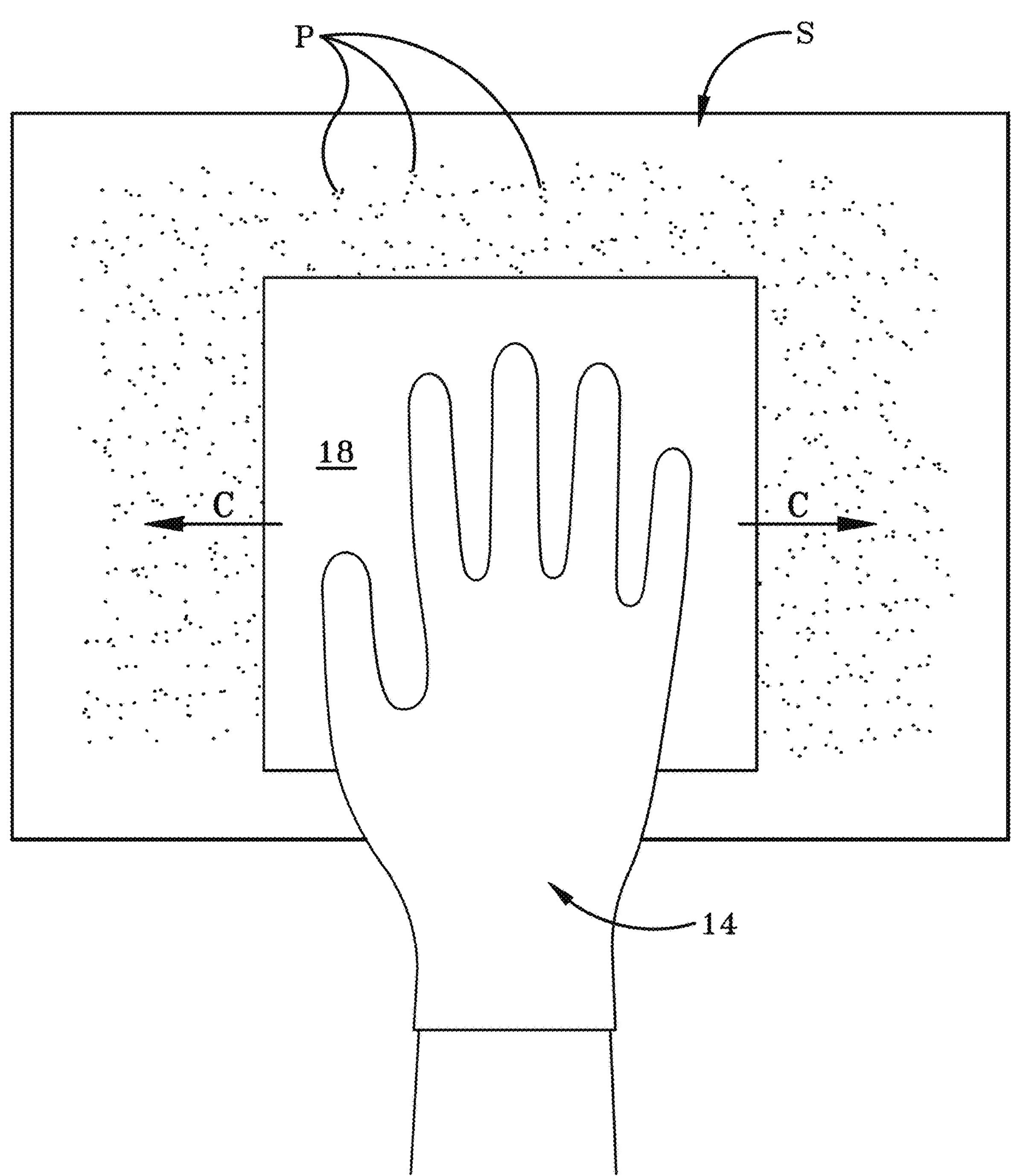
FIG. 2C is a diagrammatic view showing the wipe being held in the evidence taker's gloved hand and being moved across a surface in order to gather trace-evidence therefrom.

FIG. 2C diagrammatically shows the substance-detection substrate 18 being held in an evidence-taker's hand which is covered by glove 14 and being moved back-and-forth over a surface "S". It will be understood that the surface "S" as illustrated in FIG. 2C is representative of any type of surface with which the substrate 18 may be brought into contact. The illustrated surface "S" is to be understood as being representative of any type of surface from which evidence is to be gathered. For example, the surface "S" be the hands, the face, or clothing of person found at a scene where evidence is being gathered. In other instances, the surface "S" may be a surface of a piece of furniture or a floor surface.

FIG. 2C shows the surface "S" covered with a fine powder "P" of unknown nature. It should be understood that in many instances, the powder "P" may be on the surface "S" but may not be visible to the person gathering evidence from surface "S". It should further be understood that the powder "P" illustrated in FIG. 2C is an example of any potentially dangerous substance which may be on surface "S". For example, instead of solid particles of a potentially dangerous substance being on surface "S", a quantity of a potentially dangerous liquid may be on surface "S". The potentially dangerous liquid is to be understood as being represented by powder "P" in FIG. 2C. The substrate 18, as it is moved across surface "S" in the manner indicated by arrows "C", contacts the powder "P", and gathers particles of the powder "P" thereon. If the potentially dangerous substance is a liquid "P", then some of that liquid will soak into the substrate 18.

Figure 3:
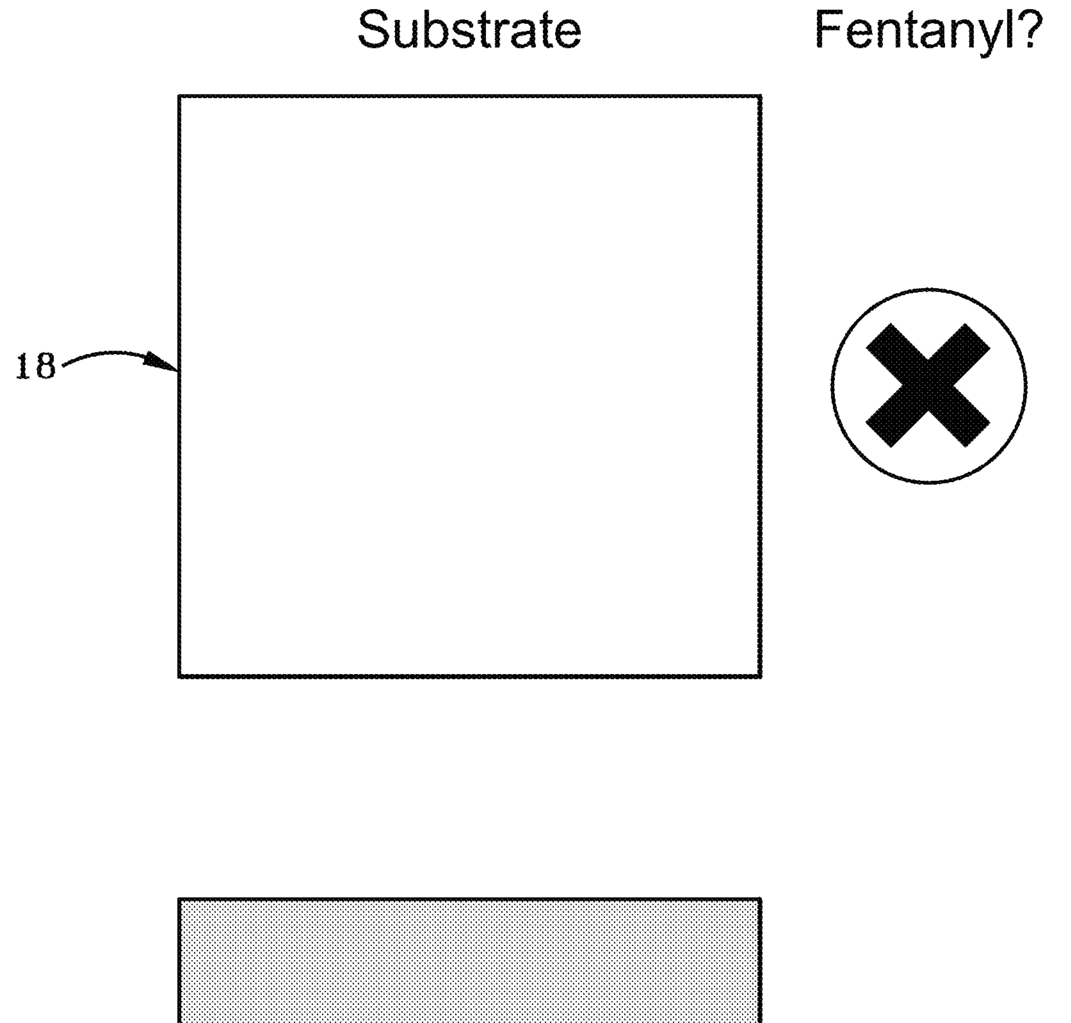
FIG. 3 is a diagrammatic view of the wipe shown after moving the same across the surface to gather trace-evidence; with the figure showing a first instance where the wipe does not change color because no fentanyl was picked up by the wipe, and showing a second instance where the wipe changes color because fentanyl was picked up by the wipe.

The substrate 18 may be manufactured or treated to change color if the substrate 18 comes into contact with a dangerous substance such as fentanyl. For example, as described previously herein, the substrate 18 may be brought into contact with a wetting agent prior to being removed from pouch 16 and the wetting agent will prime the substrate 18 to detect dangerous opioids. When the manufactured or treated substrate 18 is wiped across surface "S" and comes into contact with powder "P", if the powder "P" is not the dangerous substance, the color of the substrate 18 will remain unchanged. But, if the powder "P" is the dangerous substance, the color of the substrate 18 will change. This is illustrated in FIG. 3. The color-change signals to the evidence taker that they will need to take extra caution while gathering further evidence and handling people or objects at the scene.

As mentioned earlier herein, evidence kit 10 also includes an evidence bag 20. Evidence bag 20 is a flexible container shown in FIG. 4A to have a front 20*a* and back (not shown) which are joined to one another along a bottom edge 20*b* and opposed side edges 20*c*, 20*d*. The front 20*a* and back bound and define an interior space 20*e* (FIG. 4A) which is accessible through an opening defined by a top edge of front 20*a*' and back (not shown). One or more sealing strips 20*f*, 20*g* are provided on interior surfaces of one or both of the front 20*a* and back of evidence bag 20. These sealing strips 20*f*, 20*g*, prior to use of evidence bag 20, do not close off access to the interior space 20*e*. A line of weakness 20*h* is provided on front 20*a* and the back of evidence bag 20, with the line of weakness 20 extending between notches 20*j*, 20*k* on opposed sides 20*b*, 20*c* of evidence bag 20. A label 20*m* is provided on front 20*a* which includes areas to be completed by the evidence taker upon taking evidence. It will be understood that an additional label may be provided on the back of the evidence bag 20.

Figure 4A:
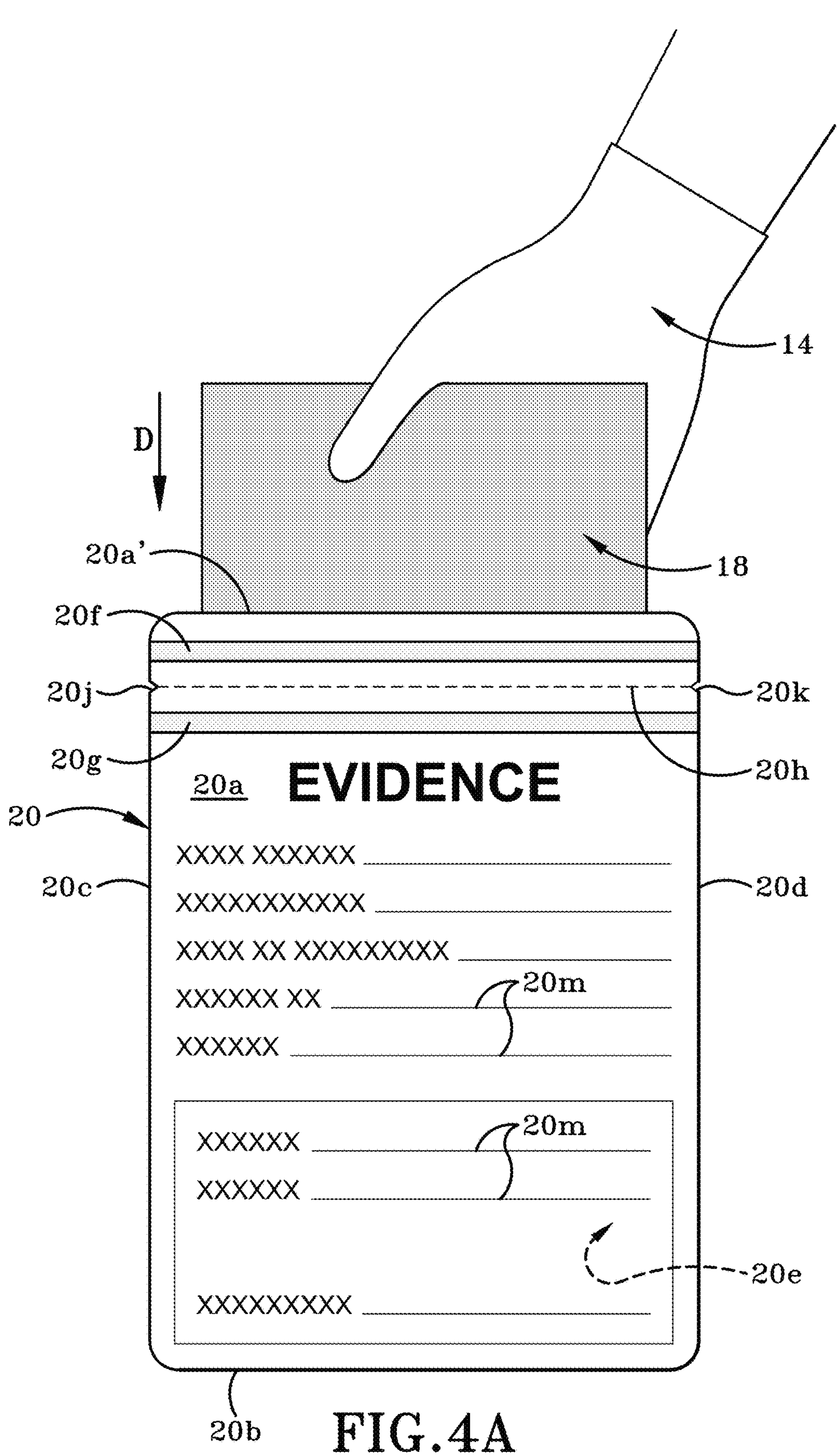
FIG. 4A shows a front elevation view of the evidence bag and showing the gloved hand of the evidence taker inserting the used wipe into the interior of the evidence bag.

Evidence bag 20 may be removed from container 12 when pouch 16 is removed therefrom so that the evidence bag 20 is available for use by the evidence taker after use of the substance-detection substrate 18. FIG. 4A shows a color-changed substrate 18 being held in the evidence taker's hand (while still covered by glove 14), and the substrate 18 being inserted into the interior space 20*e* of evidence bag 20. The insertion of the substrate 18 into interior space 20*e* is indicated by arrow "D".

Figure 4B:
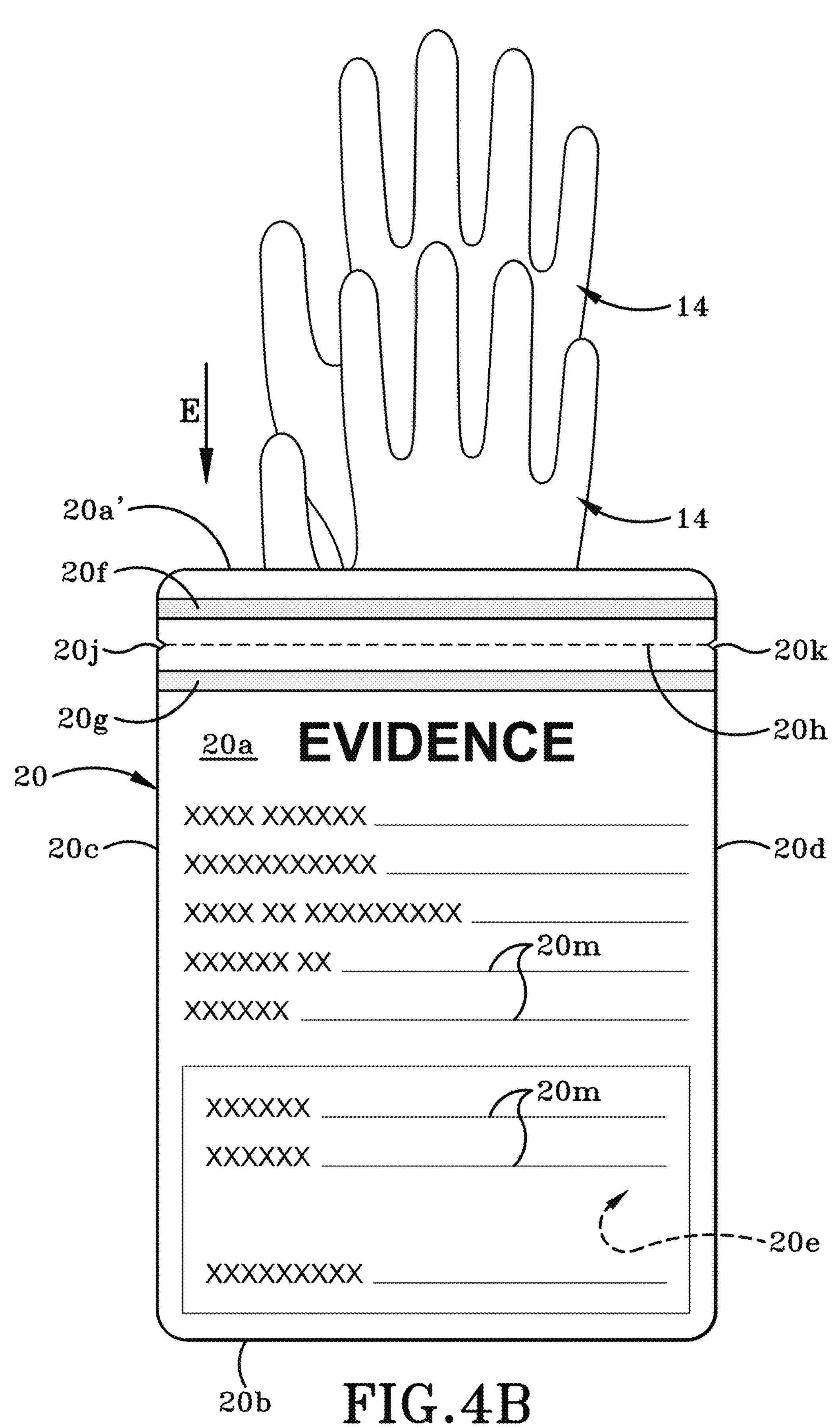
FIG. 4B shows a front elevation view of the evidence bag showing the pair of used gloves being inserted into the interior of the evidence bag.
Figure 4C:
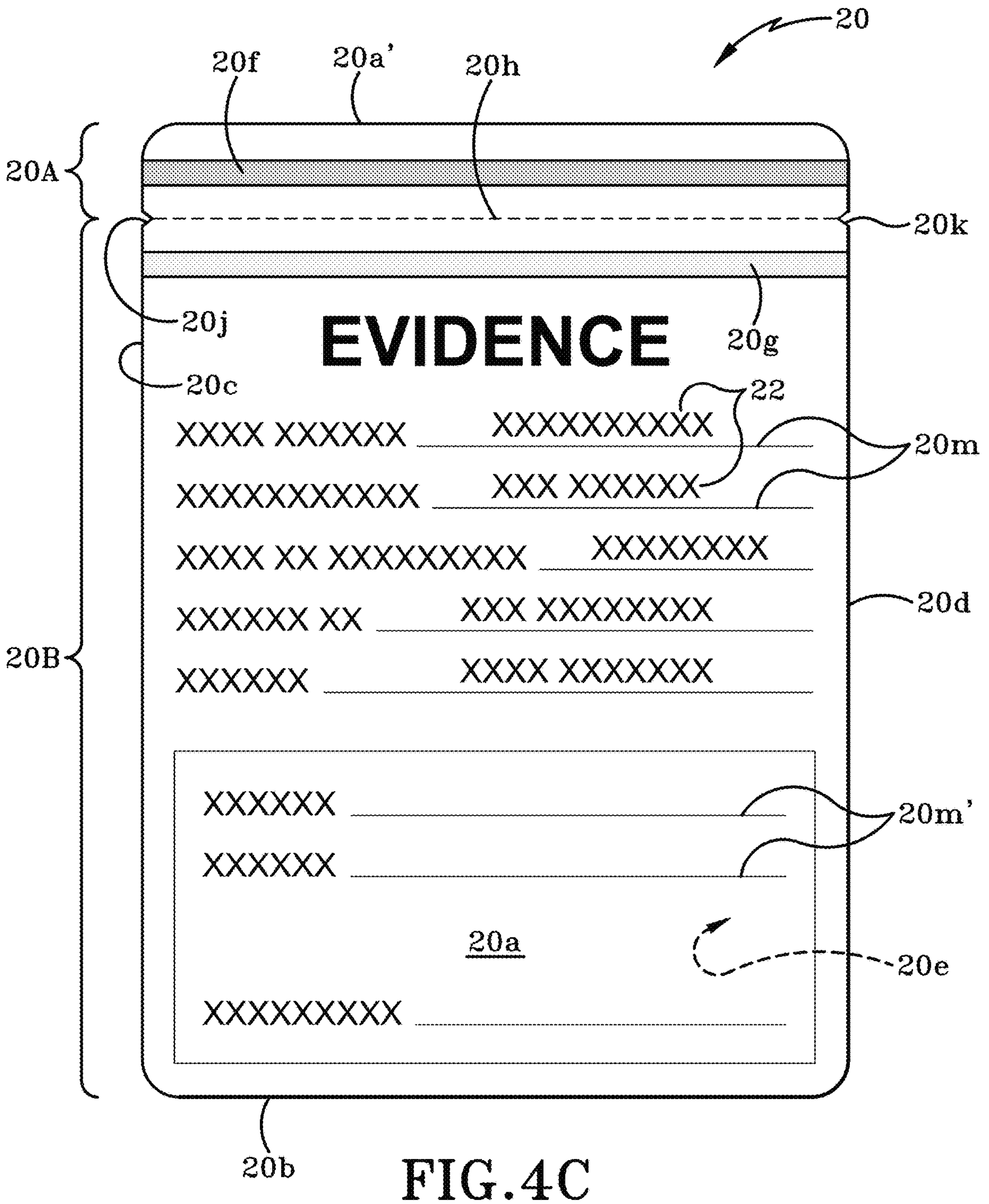
FIG. 4C is a front elevation view of the sealed evidence bag showing a label on the exterior thereof completed to record relevant information about the evidence gathering task.

Once the substrate 18 is placed within interior space 20*e* of evidence bag 20, the evidence taker will remove gloves 14 from their hands (very carefully) and will place the used gloves 14 into the interior space 20*e* of evidence bag 20 alongside the substrate 18. FIG. 4B shows gloves 14 being inserted into interior space 20*e* of evidence bag 20 in the direction of arrow "E". The evidence taker will then engage the sealing strips 20*f*, 20*g* to bond front 20*a* of evidence bag 20 to the back thereof. FIG. 4C shows the evidence bag 20 sealed shut by sealing strip 20*f*. Sealing strip 20*g* will remain unsealed. The evidence taker will then complete the label 20*m* but writing relevant information 22 thereon. This information 22 may include such information as the date, location, and time at which the evidence was taken from the scene.

The sealed evidence bag 20 is then taken to a remote laboratory where further testing of the substrate 18 (and gloves 14) may be undertaken to verify the nature of the powder "P" on substrate 18 which was gathered from the scene. In order to gain access to substrate 18, a laboratory technician will remove a top region 20A of evidence bag 20 from a bottom region 20B thereof by tearing off top region 20A along lines of weakness 20*h*. The substrate 18 is removed from interior space 20*e*, is tested, and is then placed back into interior space 20*e* after testing. At this point, second sealing strip 20*g* may be engaged to once again close off access to interior space 20*e*. Second sealing strip 20*g*, like first sealing strip 20*f* preferably does not permit evidence bag 20 to be opened without damaging evidence bag 20 in some fashion. This aids in preventing evidence tampering from occurring without being detected.

In some instances, evidence bag 20 includes a region 20*m*' (FIG. 4C) on label 20*m* which allows the laboratory technician to record relevant testing information thereon. Relevant testing information may include the name of the laboratory technician, the date, location, and time of testing, along with test results.

In other instances, it will not be necessary to perform laboratory tests on the substrate 18 because the color change in the substrate 18 will itself testify as to what dangerous substance was present at the scene when evidence was taken. If no laboratory testing is needed or after laboratory testing is completed, the sealed evidence bag 20 or resealed evidence bag 20 may be placed in an evidence lock-up facility for later use in a court proceeding.

It will be understood that more than one pouch 16 may be provided within evidence kit 10 and that each of the different pouches 16 may include substrates 18 which are each used to detect a different substance. If evidence kit 16 includes more than one pouch 16 therein, then evidence kit 16 may further include multiple evidence bags 20 therein and container 12 may be configured to be closeable so that all of the multiple evidence bags 20 may be returned from the scene in a single container. Alternatively, an additional bag may be included within the interior compartment 12*a* of container 12 along with gloves 14 and the plurality of pouches 16, and the plurality of evidence bags 20 so that all filled evidence bags 20 from the single scene may be moved together in the additional bag from the scene to a laboratory or evidence lock-up.

In one aspect, an exemplary embodiment of the present disclosure may provide an evidence kit 10 for taking and preserving evidence from a crime scene or accident scene, wherein the evidence kit 10 comprises a substrate 18 configured to remove a substance "P" from a surface "S" and an evidence bag 20 into which the substrate 18 is placed after collection of the evidence from the crime scene or accident scene.

In one embodiment, the evidence kit further comprises a container 12 configured to receive the substrate 18 and the evidence bag 20 therein prior to use, wherein the container 10 is configured to maintain the substrate 18 and the evidence bag 20 in a sanitary condition. (In particular, the substrate 18 is retained within a pouch or wrapper 16 until immediately prior to use thereof.) In one embodiment, the evidence kit 10 further comprises the pouch or wrapper 16 configured to receive the substrate 18 therein and to retain the substrate in a sanitary condition prior to use. In one embodiment, the substrate 18 is treated to detect a target analyte of one or more of opioids, amine-containing drugs, and xylazine. In one embodiment, the target analyte is one or more of morphine, hydrocodone, oxycodone, fentanyl, carfentanil, naloxone, endorphins, heroin, codeine, cocaine, and mixtures and derivatives thereof. In one embodiment, the substrate 18 is comprised of a material which changes in at least one physical characteristic when exposed to an opioid. In one embodiment, the at least one physical characteristic is a change in color as shown in FIG. 3. In one embodiment, the substrate 18 is configured to detect and retain trace amounts of evidence thereon or therein. In particular, the substrate is configured to detect and retain trace amounts of powder-evidence thereon or therein. For example, the substrate 18 may be a woven-type of fabric which traps powder particles between fibers of the fabric.

In one embodiment, the evidence kit 10 further comprises a pair of gloves 14, wherein the pair of gloves 14 is placed into the evidence bag 20 after collection of the evidence from the crime scene or accident scene. In one embodiment, the evidence kit 10 further comprises a container 12 configured to receive the pair of gloves 14, the substrate 18, and the evidence bag 20 therein prior to use, wherein the container 12 is configured to maintain the pair of gloves 14, the substrate 18, and the evidence bag 20 in a sanitary condition. For example, the substrate 18 may be retained in a pouch or wrapper 16. In one embodiment, the pair of gloves 14 is manufactured from a glove material which is resistant to one or more of opioids, toxic substances, corrosive chemicals, and bodily fluids.

In one embodiment, the evidence bag 10 includes a label 20*m* on an exterior surface thereof, wherein the label 20*m* includes areas in which information 22 pertaining to an evidence-collection task is able to be entered. It should be noted that the label 20*m* may be printed directly on the exterior surface of the evidence bag 10 or the label may be a separate component which is adhered or otherwise applied to the exterior surface of the evidence bag 20.

In another aspect, an exemplary embodiment of the present disclosure may provide a method of taking evidence from a crime scene or accident scene comprising providing an evidence kit 10 including a container 12 into which is placed a substrate 18 configured to remove a substance "P" from a surface "S", and an evidence bag 20; removing the substrate 18 from the container 12; contacting the surface "S" with the substrate 18; collecting powder-evidence "P" from the surface "S" with the substrate 18; placing the substrate "S" with collected powder-evidence "P" thereon in the evidence bag 20; and sealing the evidence bag 20.

In one embodiment, providing the substrate 18 includes manufacturing the substrate 18 from a material which changes in at least one physical characteristic when brought into contact with an opioid drug or a mixture which includes an opioid. In one embodiment, the method further comprises changing the color of the material of the substrate 18 when the substrate 18 is brought into contact with the opioid drug or the mixture which includes the opioid. In one embodiment, the method further comprises removing the substrate 18 from a pouch or wrapper 16 prior to contacting the surface with the substrate 18. In one embodiment, the substrate 18 is removed from the container 12 using gloved-hands, is removed from the pouch or wrapper 16, and is then brought into contact with surface "S" to collect powder-evidence therefrom. In other embodiments, the substrate 18 is removed from the container 12 using bare hands, i.e., no gloves 14 on the user's hands, but then gloves 14 are donned before substrate 18 is removed from pouch or wrapper 16 and prior to bringing the substrate 18 into contact with the surface "S".

In one embodiment, the method further comprises providing a pair of gloves 14 as part of the evidence kit, wherein the pair of gloves 14 is placed into the container 12 with the substrate 18 and the evidence bag 20. In one embodiment, the method further comprises removing the pair of gloves 14 from the container 12; and donning the pair of gloves 14 before contacting the surface "S" with the substrate 18. In one embodiment, providing the pair of gloves 14 includes fabricating the pair of gloves 14 from glove material which is one or more of opioid-resistant, bodily fluid resistant, and toxic or corrosive chemical resistant.

In one embodiment, the method further comprises recording evidence-collection-related information 22 on an exterior surface of the evidence bag 20. In one embodiment, the method further comprises sealing a first sealing strip 20*f* after placing the pair of gloves 14 and the substrate 18 within the evidence bag 12. In one embodiment, the method further comprises removing the pair of gloves 14 and the substrate 18 from the evidence bag 20 for examination and/or testing of one or both of the substrate 18 and the pair of gloves 14; replacing the substrate 18 and/or the pair of gloves 14 into an interior of the evidence bag 20 after the examination and/or testing, and sealing a second sealing strip 20*g* to retain the substrate 18 and/or the pair of gloves 14 within the interior of the evidence bag 20. The evidence bag 20 may then be stored for later access to the evidence as needed. For example, the evidence 20 may be placed into an evidence locker. In other instances, the pair of gloves 14 is omitted from the evidence bag 12 and only the substrate 18 with collected powder-evidence thereon is placed into the evidence bag 20, is later removed for testing, and is then placed in an evidence locker or other storage facility for subsequent reference.

In another aspect, an exemplary embodiment of the present disclosure may provide a method of taking evidence at a crime scene or accident scene using an evidence kit 10, said method comprising opening a container 12; removing a pair of gloves 14 from the container 12; donning the pair of gloves 14; removing a wipe 18 in a sanitary pouch or wrapping 16 from the container 12; removing the wipe 18 from the sanitary pouch or wrapping 16; wiping a surface "S" at the crime scene or accident scene with the wipe 18 such that the wipe 18 picks up trace-evidence thereon or therein; removing an evidence bag 20 from the container 12; placing the wipe 18 with trace-evidence thereon into the evidence bag 20; doffing the pair of gloves 14; placing the pair of gloves 14 into the evidence bag 20; and sealing the evidence bag 20. It will be understood that in some embodiments, the gloves 14 may not be provided within the container 12 of the evidence kit 10 but may be removed from another container (not shown herein). After gathering of the evidence, the gloves 14 may be placed into the container 12 or may be omitted therefrom.

Various inventive concepts may be embodied as one or more methods, of which an example has been provided. The acts performed as part of the method may be ordered in any suitable way. Accordingly, embodiments may be constructed in which acts are performed in an order different than illustrated, which may include performing some acts simultaneously, even though shown as sequential acts in illustrative embodiments.

While various inventive embodiments have been described and illustrated herein, those of ordinary skill in the art will readily envision a variety of other means and/or structures for performing the function and/or obtaining the results and/or one or more of the advantages described herein, and each of such variations and/or modifications is deemed to be within the scope of the inventive embodiments described herein. More generally, those skilled in the art will readily appreciate that all parameters, dimensions, materials, and configurations described herein are meant to be exemplary and that the actual parameters, dimensions, materials, and/or configurations will depend upon the specific application or applications for which the inventive teachings is/are used. Those skilled in the art will recognize, or be able to ascertain using no more than routine experimentation, many equivalents to the specific inventive embodiments described herein. It is, therefore, to be understood that the foregoing embodiments are presented by way of example only and that, within the scope of the appended claims and equivalents thereto, inventive embodiments may be practiced otherwise than as specifically described and claimed. Inventive embodiments of the present disclosure are directed to each individual feature, system, article, material, kit, and/or method described herein. In addition, any combination of two or more such features, systems, articles, materials, kits, and/or methods, if such features, systems, articles, materials, kits, and/or methods are not mutually inconsistent, is included within the inventive scope of the present disclosure.

The articles "a" and "an," as used herein in the specification and in the claims, unless clearly indicated to the contrary, should be understood to mean "at least one." The phrase "and/or," as used herein in the specification and in the claims (if at all), should be understood to mean "either or both" of the elements so conjoined, i.e., elements that are conjunctively present in some cases and disjunctively present in other cases. Multiple elements listed with "and/or" should be construed in the same fashion, i.e., "one or more" of the elements so conjoined. Other elements may optionally be present other than the elements specifically identified by the "and/or" clause, whether related or unrelated to those elements specifically identified. Thus, as a non-limiting example, a reference to "A and/or B", when used in conjunction with open-ended language such as "comprising" can refer, in one embodiment, to A only (optionally including elements other than B); in another embodiment, to B only (optionally including elements other than A); in yet another embodiment, to both A and B (optionally including other elements); etc. As used herein in the specification and in the claims, "or" should be understood to have the same meaning as "and/or" as defined above. For example, when separating items in a list, "or" or "and/or" shall be interpreted as being inclusive, i.e., the inclusion of at least one, but also including more than one, of a number or list of elements, and, optionally, additional unlisted items. Only terms clearly indicated to the contrary, such as "only one of" or "exactly one of," or, when used in the claims, "consisting of," will refer to the inclusion of exactly one element of a number or list of elements. In general, the term "or" as used herein shall only be interpreted as indicating exclusive alternatives (i.e. "one or the other but not both") when preceded by terms of exclusivity, such as "either," "one of," "only one of," or "exactly one of." "Consisting essentially of," when used in the claims, shall have its ordinary meaning as used in the field of patent law.

As used herein in the specification and in the claims, the phrase "at least one," in reference to a list of one or more elements, should be understood to mean at least one element selected from any one or more of the elements in the list of elements, but not necessarily including at least one of each and every element specifically listed within the list of elements and not excluding any combinations of elements in the list of elements. This definition also allows that elements may optionally be present other than the elements specifically identified within the list of elements to which the phrase "at least one" refers, whether related or unrelated to those elements specifically identified. Thus, as a non-limiting example, "at least one of A and B" (or, equivalently, "at least one of A or B," or, equivalently "at least one of A and/or B") can refer, in one embodiment, to at least one, optionally including more than one, A, with no B present (and optionally including elements other than B); in another embodiment, to at least one, optionally including more than one, B, with no A present (and optionally including elements other than A); in yet another embodiment, to at least one, optionally including more than one, A, and at least one, optionally including more than one, B (and optionally including other elements); etc.

While components of the present disclosure are described herein in relation to each other, it is possible for one of the components disclosed herein to include inventive subject matter, if claimed alone or used alone. In keeping with the above example, if the disclosed embodiments teach the features of A and B, then there may be inventive subject matter in the combination of A and B, A alone, or B alone, unless otherwise stated herein.

As used herein in the specification and in the claims, the term "effecting" or a phrase or claim element beginning with the term "effecting" should be understood to mean to cause something to happen or to bring something about. For example, effecting an event to occur may be caused by actions of a first party even though a second party actually performed the event or had the event occur to the second party. Stated otherwise, effecting refers to one party giving another party the tools, objects, or resources to cause an event to occur. Thus, in this example a claim element of "effecting an event to occur" would mean that a first party is giving a second party the tools or resources needed for the second party to perform the event, however the affirmative single action is the responsibility of the first party to provide the tools or resources to cause said event to occur.

When a feature or element is herein referred to as being "on" another feature or element, it can be directly on the other feature or element or intervening features and/or elements may also be present. In contrast, when a feature or element is referred to as being "directly on" another feature or element, there are no intervening features or elements present. It will also be understood that, when a feature or element is referred to as being "connected", "attached" or "coupled" to another feature or element, it can be directly connected, attached or coupled to the other feature or element or intervening features or elements may be present. In contrast, when a feature or element is referred to as being "directly connected", "directly attached" or "directly coupled" to another feature or element, there are no intervening features or elements present. Although described or shown with respect to one embodiment, the features and elements so described or shown can apply to other embodiments. It will also be appreciated by those of skill in the art that references to a structure or feature that is disposed "adjacent" another feature may have portions that overlap or underlie the adjacent feature.

Spatially relative terms, such as "under", "below", "lower", "over", "upper", "above", "behind", "in front of", and the like, may be used herein for ease of description to describe one element or feature's relationship to another element(s) or feature(s) as illustrated in the figures. It will be understood that the spatially relative terms are intended to encompass different orientations of the device in use or task in addition to the orientation depicted in the figures. For example, if a device in the figures is inverted, elements described as "under" or "beneath" other elements or features would then be oriented "over" the other elements or features. Thus, the exemplary term "under" can encompass both an orientation of over and under. The device may be otherwise oriented (rotated 90 degrees or at other orientations) and the spatially relative descriptors used herein interpreted accordingly. Similarly, the terms "upwardly", "downwardly", "vertical", "horizontal", "lateral", "transverse", "longitudinal", and the like are used herein for the purpose of explanation only unless specifically indicated otherwise.

Although the terms "first" and "second" may be used herein to describe various features/elements, these features/elements should not be limited by these terms, unless the context indicates otherwise. These terms may be used to distinguish one feature/element from another feature/element. Thus, a first feature/element discussed herein could be termed a second feature/element, and similarly, a second feature/element discussed herein could be termed a first feature/element without departing from the teachings of the present invention.

An embodiment is an implementation or example of the present disclosure. Reference in the specification to "an embodiment," "one embodiment," "some embodiments," "one particular embodiment," "an exemplary embodiment," or "other embodiments," or the like, means that a particular feature, structure, or characteristic described in connection with the embodiments is included in at least some embodiments, but not necessarily all embodiments, of the invention. The various appearances "an embodiment," "one embodiment," "some embodiments," "one particular embodiment," "an exemplary embodiment," or "other embodiments," or the like, are not necessarily all referring to the same embodiments.

If this specification states a component, feature, structure, or characteristic "may", "might", or "could" be included, that particular component, feature, structure, or characteristic is not required to be included. If the specification or claim refers to "a" or "an" element, that does not mean there is only one of the element. If the specification or claims refer to "an additional" element, that does not preclude there being more than one of the additional element.

As used herein in the specification and claims, including as used in the examples and unless otherwise expressly specified, all numbers may be read as if prefaced by the word "about" or "approximately," even if the term does not expressly appear. The phrase "about" or "approximately" may be used when describing magnitude and/or position to indicate that the value and/or position described is within a reasonable expected range of values and/or positions. For example, a numeric value may have a value that is +/−0.1% of the stated value (or range of values), +/−1% of the stated value (or range of values), +/−2% of the stated value (or range of values), +/−5% of the stated value (or range of values), +/−10% of the stated value (or range of values), etc. Any numerical range recited herein is intended to include all sub-ranges subsumed therein.

Additionally, the method of performing the present disclosure may occur in a sequence different than those described herein. Accordingly, no sequence of the method should be read as a limitation unless explicitly stated. It is recognizable that performing some of the steps of the method in a different order could achieve a similar result.

In the claims, as well as in the specification above, all transitional phrases such as "comprising," "including," "carrying," "having," "containing," "involving," "holding," "composed of," and the like are to be understood to be open-ended, i.e., to mean including but not limited to. Only the transitional phrases "consisting of" and "consisting essentially of" shall be closed or semi-closed transitional phrases, respectively.

To the extent that the present disclosure has utilized the term "invention" in various titles or sections of this specification, this term was included as required by the formatting requirements of word document submissions pursuant the guidelines/requirements of the United States Patent and Trademark Office and shall not, in any manner, be considered a disavowal of any subject matter.

In the foregoing description, certain terms have been used for brevity, clearness, and understanding. No unnecessary limitations are to be implied therefrom beyond the requirement of the prior art because such terms are used for descriptive purposes and are intended to be broadly construed.

Moreover, the description and illustration of various embodiments of the disclosure are examples and the disclosure is not limited to the exact details shown or described.

What is claimed is:

1. A method of collecting evidence from a crime scene or accident scene comprising:

providing an evidence kit including a container and within the container is a sanitary pouch or wrapper into which is placed a substrate in the form of a wipe configured to remove a substance from a surface and wherein the wipe is pre-wetted within the sanitary pouch or wrapper via a wetting agent, wherein the wetting agent primes the substrate to detect a target analyte selected from opioids, amine-containing drugs, and xylazine, and within the container is an evidence bag;

opening the container and removing the sanitary pouch or wrapper;

removing the substrate from the sanitary pouch or wrapper;

contacting the surface with the substrate;

collecting powder-evidence from the surface with the substrate;

placing the substrate with collected powder-evidence thereon in the evidence bag; and sealing the evidence bag.

2. The method according to claim 1, wherein providing the substrate includes manufacturing the substrate from a material which changes in at least one physical characteristic when brought into contact with an opioid drug or a mixture which includes an opioid.

3. The method according to claim 1, further comprising providing a pair of gloves as part of the evidence kit, wherein the pair of gloves is placed into the container with the sanitary pouch or wrapper into which is placed the substrate and the evidence bag.

4. The method according to claim 3, further comprising:

removing the pair of gloves from the container; and donning the pair of gloves before contacting the surface with the substrate.

5. The method according to claim 3, wherein providing the pair of gloves includes fabricating the pair of gloves from glove material which is one or more of opioid-resistant, bodily fluid resistant, and toxic or corrosive chemical resistant.

6. The method according to claim 1, further comprising recording evidence-collection-related information on an exterior label on a surface of the evidence bag, wherein the exterior label includes at least two different label sections, wherein a first label section is configured for recording information at the crime scene or accident scene and a second label section is configured for subsequently recording laboratory testing information after examination.

7. The method according to claim 2, wherein the at least one physical characteristic is a change in color that is visually perceptible upon contact with the opioid-containing mixture.

8. The method according to claim 1, further comprising:

removing the substrate from the sanitary pouch or wrapper immediately prior to contacting the surface with the substrate.

9. The method according to claim 1, wherein the target analyte comprises one or more of morphine, hydrocodone, oxycodone, fentanyl, carfentanil, naloxone, endorphins, heroin, codeine, cocaine, xylazine, and mixtures or derivatives thereof.

10. The method according to claim 5, further comprising doffing the pair of gloves after placing the substrate into the evidence bag and placing the doffed pair of gloves into the evidence bag prior to sealing.

11. The method according to claim 1, wherein the evidence bag comprises first and second sealing strips, and the method further comprises sealing the first sealing strip at the scene after placing contents into the evidence bag and, after opening the bag for examination, resealing the evidence bag by engaging the second sealing strip.

12. The method according to claim 11, wherein opening the evidence bag for examination comprises tearing off a top region of the evidence bag along a line of weakness defined between opposed notches to expose an interior of the evidence bag.

13. The method according to claim 1, wherein the substrate is configured to detect and retain trace amounts of powder-evidence thereon or therein, and wherein the substrate comprises a woven fabric that traps powder particles between fibers of the fabric.

14. The method according to claim 1, wherein the container houses a plurality of pouches each containing a different substrate configured to detect a different substance and a plurality of evidence bags, and the method further comprises, for each substrate, repeating the removing, contacting, collecting, placing, and sealing steps and returning the sealed evidence bags together from the scene in the container or in an additional bag.

15. A method of collecting evidence from a crime scene or accident scene comprising:

providing an evidence kit including a container and within the container is a sanitary pouch or wrapper into which is placed a substrate in the form of a wipe configured to remove a substance from a surface and wherein the sanitary pouch or wrapper includes a separate compartment containing a wetting agent isolated from the substrate by a frangible seal, and within the container is an evidence bag;

opening the container and removing the sanitary pouch or wrapper;

breaking the frangible seal to release the wetting agent and wet the substrate before contacting the surface, wherein wetting the substrate primes the substrate to detect a target analyte selected from opioids, amine-containing drugs, and xylazine;

removing the substrate from the sanitary pouch or wrapper;

contacting the surface with the substrate;

collecting powder-evidence from the surface with the substrate;

placing the substrate with collected powder-evidence thereon in the evidence bag; and sealing the evidence bag.

* * * * *